May 23, 1950 L. C. YOUNG 2,508,440
JOLT STRIPPER MOLDING MACHINE
Filed April 23, 1946 5 Sheets-Sheet 1

INVENTOR.
Lester C. Young
BY Woodling and Krost
attys

May 23, 1950 L. C. YOUNG 2,508,440
JOLT STRIPPER MOLDING MACHINE
Filed April 23, 1946 5 Sheets-Sheet 2

INVENTOR.
Lester C. Young
BY Woodling and Krost
attys

Patented May 23, 1950

2,508,440

UNITED STATES PATENT OFFICE 2,508,440

JOLT STRIPPER MOLDING MACHINE

Lester C. Young, Cleveland, Ohio, assignor to Spo, Inc., a corporation of Ohio

Substituted for abandoned application Serial No. 415,157, October 16, 1941. This application April 23, 1946, Serial No. 664,190

3 Claims. (Cl. 22—49)

This invention relates to jolt stripper molding machines of the type employed in the production of green sand molds and has for its primary object to provide an improved stripper means so arranged that a materially greater pattern draw is afforded thereby adapting the machines for the handling of patterns of substantially larger sizes than heretofore.

Another object of the present invention is to provide a stripper means so constructed and arranged on a jolt machine that the effective pattern draw is materially increased without the necessity of impracticably increasing the overall size of the machine.

Another object of the present invention is to provide suitable guide means for the stripper pins extending upwardly from the base of the machine in relatively spaced relation to insure rigidity of the stripper pins.

Another object of the present invention is to provide an improved equalizing means for effecting uniform movement of the stripper pins regardless of any tendency toward relatively different independent movement to insure accurate stripping of the mold from the pattern.

Another object of the present invention is to provide a machine of the character referred to which is simple in construction, efficient in operation, and inexpensive to manufacture and assemble.

Other objects and a fuller understanding of my invention may be had by referring to the following description and claims, taken in conjunction with the accompanying drawing, in which:

Figure 1:
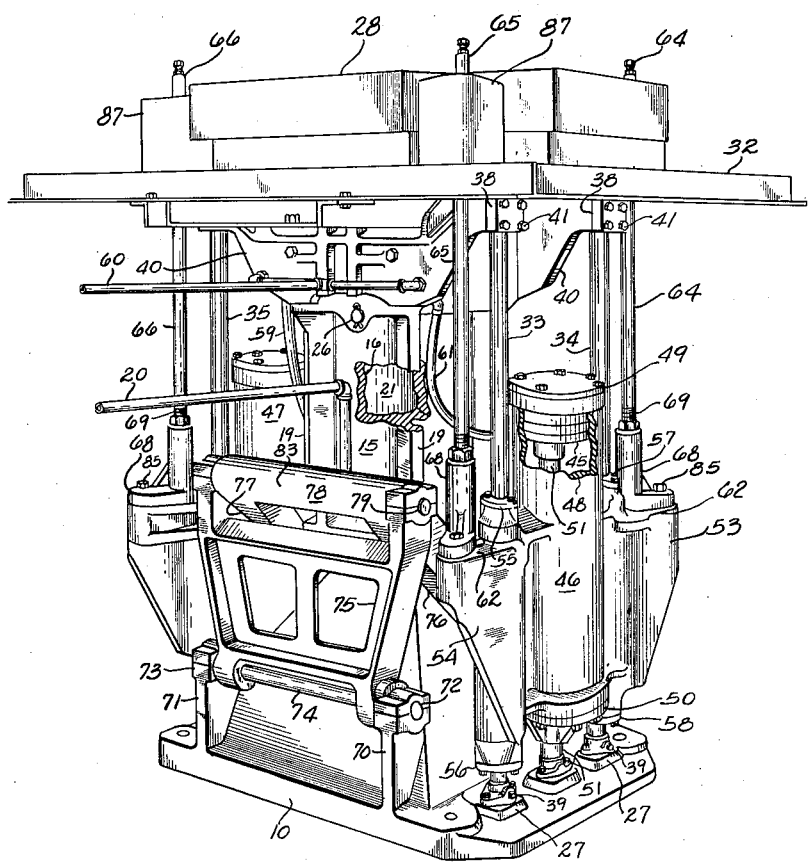
Figure 1 is a pictorial view of a jolt stripper molding machine embodying my invention with the stripper pins shown in their unraised or lowermost position.

In the drawings I have shown the improved stripper means embodied in a jolt molding machine because of its simplicity in construction and operation but the stripper means is adaptable for embodiment in other types of molding machines which will be readily apparent to those familiar with the art and the invention is therefore in no way so restricted.

The jolt machine comprises a base 10, of rectangular shape, having a relatively flat bottom adapted to rest on a suitable foundation such as the bottom of a pit or other suitable support and preferably constructed of a semi-steel casting or any other suitable material. The upper surface of the base 10 extends upwardly and inwardly at an angle and terminates in an upper surface or end 11 substantially parallel with the base 10, see Figure 4. An integral marginal flange 12 projects outwardly and extends entirely around the upper end of the base while the upper surface or end 11 is recessed at 13 except for a centrally disposed projection 14 having a flat face which functions as an anvil in a manner to be later described.

A jolt cylinder 15, preferably constructed of a semi-steel casting or any other suitable material, is disposed above the base 10 and has a bore 16 of suitable diameter extending outwardly in perpendicular relation to the end 11. The lower end of the cylinder 15 has a laterally extending peripheral flange 17 engageable with the flange 12 and detachably connected thereto by bolts or other suitable means. The cylinder 15 has its outer wall provided with outwardly projecting integral ribs 19 extending longitudinally therealong for reinforcing the same.

Figure 4:
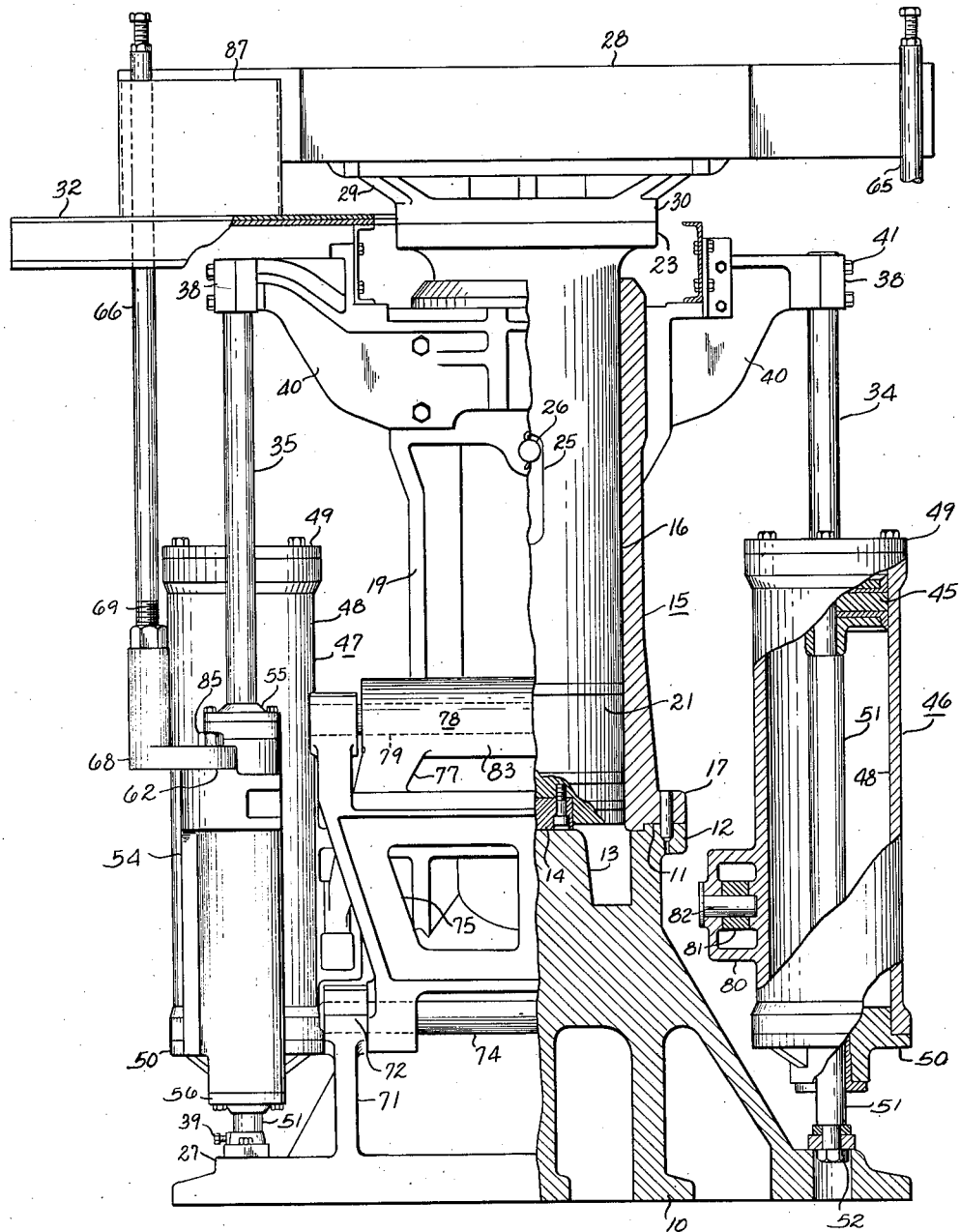
Figure 4 is a front elevational view of my jolt stripper molding machine with certain parts shown in longitudinal section.

A jolt piston 21, preferably constructed of a semi-steel casting or any other suitable material, is snugly but slidably disposed within the bore 16 of the cylinder 15 and has its lower end normally resting in engagement with a projection or anvil 14, see Figure 4. The piston 21 is adapted to be raised for jolting operation by fluid under pressure admitted to the lower end of the cylinder 15 through a fluid duct or pipe 20. The upper end of the piston 21 is formed with a laterally extending peripheral flange 23 disposed above the upper end of the cylinder 15. A transverse slot 25 is provided in the wall of the piston 21 substantially midway of its ends to slidably receive the free end of a pin 26, which is secured in the adjacent wall of the cylinder 15 to limit the outward sliding movement of the piston.

Figure 5:
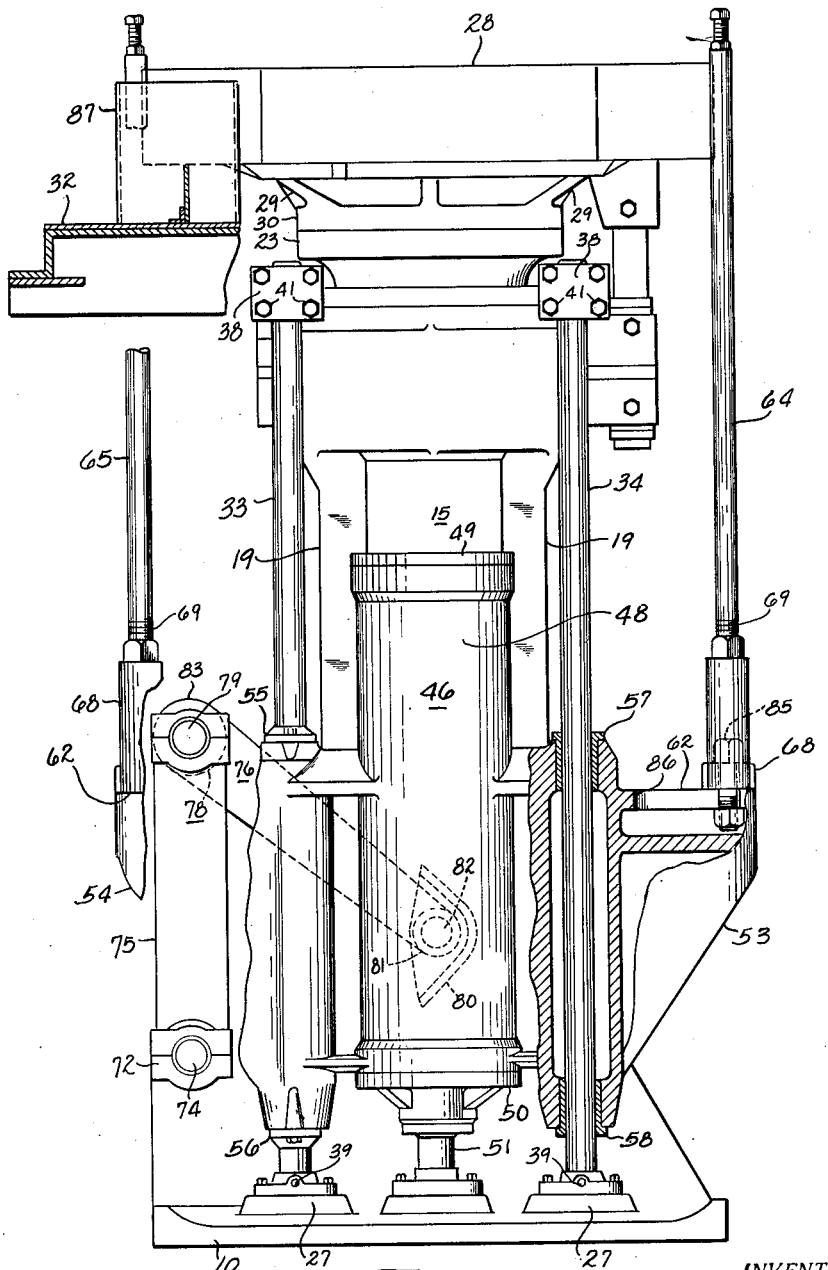
Figure 5 is a side elevational view of my jolt stripper molding machine with certain parts shown in longitudinal section.

A table 28, preferably constructed of a semi-steel casting or any other suitable material, is disposed horizontally above the upper end of the piston 21 and has a substantially flat smooth upper surface upon which the pattern, flask, and molding sand are supported in the usual manner. The table 28 has a depending centrally disposed portion 29 which terminates in a laterally extending peripheral flange 30 connected to the piston flange 23 by bolts or other suitable means for unitary movement. The table is materially large and is adapted for the handling of large patterns and has its corners indented at 31 for a purpose to be later described. So much of the description refers to the general arrangement of the elements of a jolt machine of large scale and attention is directed to the fact that the machine illustrated in Figures 4 and 5, is on a scale of approximately 1½" to 1'0". Generally jolt machines of this size are mounted in pits provided in suitable foundations and the table 28 projects outwardly a sufficient distance above the floor level as indicated by 32.

Jolt machines of the size illustrated which are equipped with the usual type of stripper mechanism have a maximum pattern draw of approximately 12" at best and in many instances considerably less which materially reduced their effectiveness in the production of green sand molds for large castings. To obtain greater pattern draw it was necessary to materially enlarge the machine elements which procedure was entirely out of practical proportions, principally because it increased the cost of the machines and further required too deep pits. The stripper means of the present invention, however, when embodied as intended upon the jolt machine illustrated only necessitated an additional 10" in its overall height to provide a pattern draw of 26". Some appreciation of the accomplishment may be had when it is pointed out that the use of the ordinary stripper mechanism heretofore available an increase of from 4' to 5' in the overall height was required to obtain the same pattern draw.

The preferable arrangement of the stripper mechanism as illustrated in the drawings comprises two pairs of guide rods 33—34 and 35—36 respectively of steel material each vertically disposed and relatively spaced. The pair of rods 33—34 are disposed on one side of the jolt cylinder 15 in relatively spaced transverse alignment while the pair of rods 35—36 are disposed on the opposite side of the cylinder, and similarly spaced relatively in transverse alignment. Each pair of rods is further relatively disposed so that the rods 33 and 35 are in longitudinal alignment on the long side and the rods 34 and 36 are in similar longitudinal alignment on the other long side thus providing four points of suspension for the stripper pin actuating mechanism in a manner to be later described. The rods are each removable thus affording replacement in case of wear and of identical structure, permitting interchangeability.

The guide rods may be removably secured to the base 10 by any suitable means and as illustrated in the drawings, the lower end of the rods are arranged respectively to fit into base receptacles 27 which have threadable set screws 39 extending horizontally therein for engaging the side of the rods. When removing the rods from the base 10, it is only necessary to unloosen the set screws and elevate the rods from their respective base receptacles. The upper ends of the guide rods are respectively supported by side arm brackets 40 which extend laterally from the upper end of the cylinder 15. The ends of the side arm brackets terminate into sockets which receive and support the upper ends of the rods. The upper ends of the rods are removably secured in the sockets by means of socket clamps or blocks 38 which may be fastened by machine screws 41 or by other suitable means to the outer lateral ends of the brackets 40. The rods are thus secured in a fixed vertical position and are supported by having their lower ends removably connected to the base 10 and by having their upper ends removably connected to the brackets 40 which are connected to the upper end of the cylinder 15. When removing the guide rods, the socket clamps 38 are removed by unscrewing the machine screws 41.

Slidably mounted upon the guide rods 33 and 34 is a stripping pin supporting unit 46 and slidably mounted upon the guide rods 35 and 36 is a stripping pin supporting unit 47. The stripping pin supporting units are alike and are preferably constructed of a semi-steel casting or any other suitable material which affords strength and rigidity. Since the stripping pin supporting units are alike, the description thereof will be directed toward the stripping pin supporting unit 46 which comprises a vertically disposed stripper cylinder 48 centrally mounted between the rods 33 and 34. The cylinder 48 has its upper end closed by a cylinder head 49 and its lower end by a cylinder head 50. Mounted within the cylinder 48 is a piston 45 which is connected to a piston rod 51 having its lower end removably connected to the base 10 by any suitable means such, for example, as by the nut 52, see Figure 4. Extending laterally of the stripper cylinder 48 are two lateral wings 53 and 54. The wing 53 is provided with a vertical opening through which the guide rod 34 extends. The upper end of the vertical opening in the lateral wing 53 is provided with a replaceable bushing 57 and the lower end of the vertical opening is provided with a replaceable bushing 58. The bushings 57 and 58 are spaced apart so as to give stabilized mounting of the stripper cylinder 48. Similarly, the lateral wing 54 is provided with a vertical opening through which the guide rod 33 extends. The upper end of the vertical opening in the lateral wing 54 is provided with a replaceable bushing 55, and the lower end is provided with a replaceable bushing 56. The pin support unit 46 is adapted to be slidably elevated upon the guide rods 33 and 34 when air or fluid under pressure is admitted to the upper end of the cylinder 48. Any suitable means may be employed to admit fluid under pressure to the upper end of the cylinder 48, and I show a fluid pipe or duct 60 having a branch on the end thereof with one branch leading to the upper end of the stripping cylinder of the stripping pin supporting unit 46 through a flexible hose 61, and with the other end of the branch leading to the upper end of the stripper cylinder of the stripping pin supporting unit 47 through the air hose 59. When fluid under pressure is admitted to the upper ends of the cylinder for the stripping pin supporting units 46 and 47, the units slide upwardly upon their respective guide rods for simultaneously raising stripper pins 64, 65, 66 and 67, the stripper pins 64 and 65 being carried by the stripping pin supporting unit 46, and the stripper pins 66 and 67 being carried by the stripping pin supporting unit 47. The stripper pins are all alike and each is provided at the lower end with an L-shaped foot 68 which rests respectively upon laterally disposed shoulders 62 of the stripping pin supporting units 46 and 47. Each of the shoulders as shown in Figure 5 is provided with a slot 86 through which a bolt 85 extends for anchoring the foot to the horizontal shoulder. In this manner, each of the stripper pins may be laterally adjusted with reference to the table 28 and the flask which is supported upon the table. Each of the stripper pins has on the lower end thereof threads 69 for threadably engaging the foot 68 so that the pins may be moved up or down to make vertical adjustments with respect to the flask mounted on top of the table 28. A guard or shield 87 is adapted to fit in the corner indentations 31 of the table top for guarding or shielding the upper ends of the stripper pins.

Figure 2:
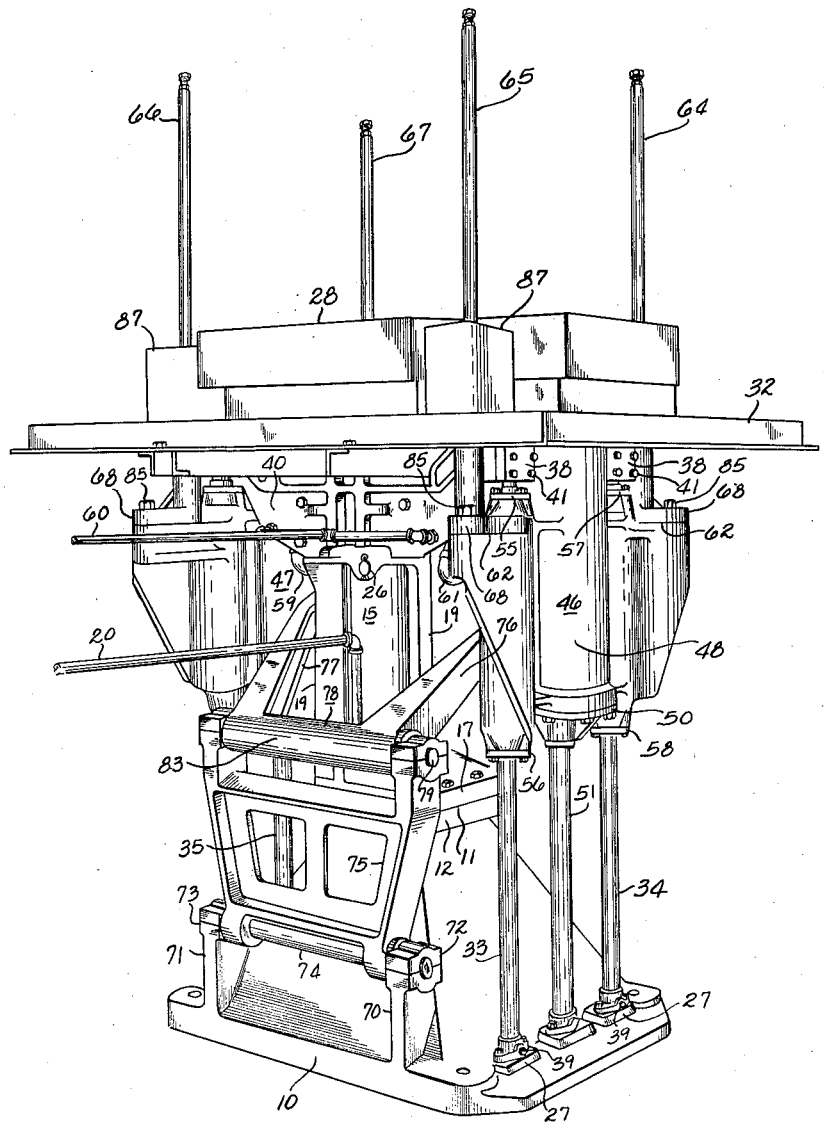
Figure 2 is a view similar to Figure 1 with the stripper pins shown in their raised or uppermost position.
Figure 3:
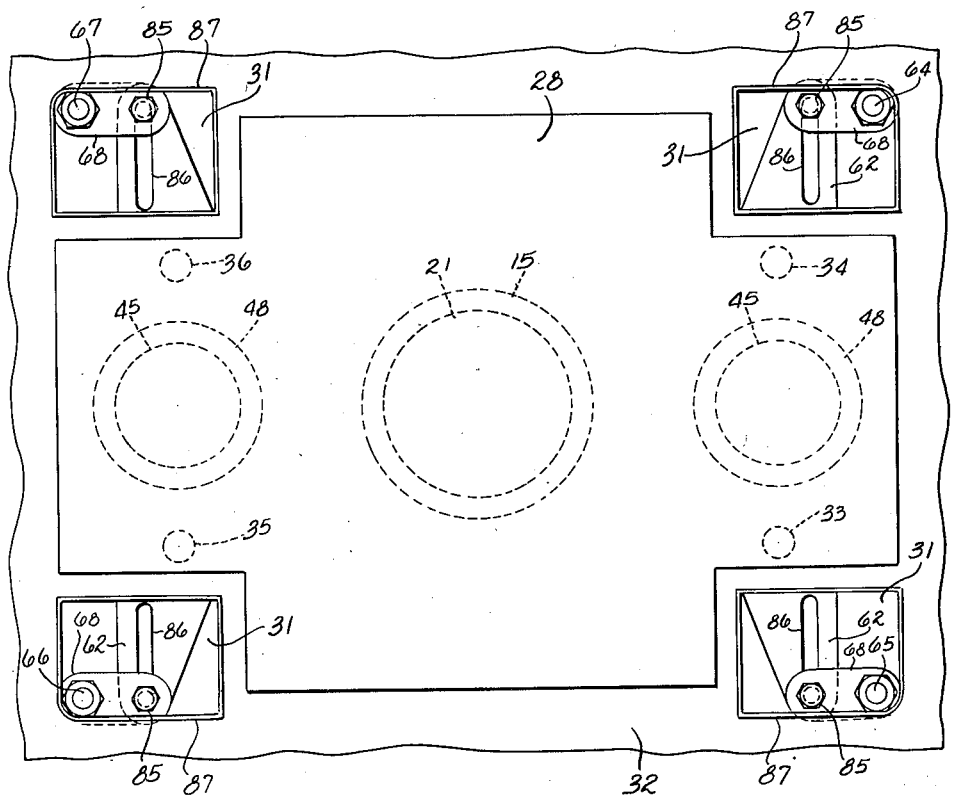
Figure 3 is a top view of my jolt stripper molding machine.

In order to assure that the stripping pin supporting units 46 and 47 move together as a unit as fluid under pressure is admitted to the stripper cylinders of the respective units, I provide a stabilizer which causes the two stripping pin supporting units to move together as a unit. The stabilizer as shown best in Figures 1, 2 and 5 comprises two hinged parts 75 and 78. The part 75 may be referred to as an equalizing link and the part 78 may be referred to as a torsion bar arm unit. The lower end of the equalizing link 75 is pivotably mounted in bearings 72 and 73 provided respectively in the upper ends of space brackets 70 and 71. Extending between the bearings 72 and 73 is a shaft 74 upon which the equalizing link 75 is carried. The torsion bar arm unit 78 comprises two spaced arms 76 and 77 connected by a torsion bar section 83. Extending through the torsion bar portion 83 is a shaft 79 upon which the torsion bar arm 78 is pivotably mounted. The free ends 81 of the two arms 76 and 77 are pivotably connected respectively to a bracket 80 on the inside surface of the cylinders for the stripping pin supporting units 46 and 47, see Figures 4 and 5. The free ends 81 of the arms 76 and 77 are connected respectively to the brackets 80 by means of pins 82. Accordingly, the arrangement of the stabilizer is such that the two stripping pin supporting units 46 and 47 move together as a unit as they slide up and down upon their respective guide rods.

In the operation of the machine, after the pins have been radially adjusted to the size of flask to be used, a pattern plate and pattern are placed upon the upper side of the table 28 and secured in the customary manner. A flask is next placed about the pattern and has its marginal flange resting upon or in close proximity to the upper free ends of the stripper pins. Green molding sand is then placed in the flask in sufficient quantity to cover the pattern and form the mold wall. Preferably air under pressure from any suitable source is introduced into the bottom of the jolt cylinder through the pipe 20 and the flow is so controlled, by an adjustable jolt exhaust valve, that the intensity of the length of the jolt stroke and impact blow for any load is afforded. The impact blows set up, by reason of the rapid reciprocation of the jolt piston 21 and its engagement in one direction with the anvil 14, are imparted to the sand particles causing the latter to settle and become compressed about the pattern in a homogeneous permeable mass of uniform density. The air to the jolt cylinder is then shut off and through a suitable control valve is admitted to the top of the stripper cylinders 46 and 47 through the pipe 60. As the air pressure builds up above the pistons their respective stripping cylinders are moved upwardly in unison, through actuation of the equalizer, which effects simultaneous upward movement of the stripper pins. Inasmuch as the pattern is secured to the relatively stationary table and the stripper pins engageable with the flask, the latter with the contained mold may be elevated until it entirely clears the pattern whereupon the air flow is interrupted. The movement of the stripper pins in a vertical direction and perpendicular to the top of the table 28 insures accurate separation between the pattern and mold without the necessity for peening or other manual touching up. Any unequal distribution of the flask load on the stripper pins is compensated for by the stabilizer so that accurate stripping of the flask is always assured. After the mold has been stripped from the pattern the former may be removed from the stripper pins in the usual manner for further use and the pins returned to lower position.

If a squeeze operation is desired, a squeeze head may be mounted above the table in the usual manner and positioned for entrance into the top of the flask. After the jolting operation, the piston 21 will be elevated until the squeeze head engages the molding sand in the flask to further compact the sand after which the pattern is stripped from the mold by lowering the piston while the stripper pins are in engagement with the flask in the manner heretofore described.

This application is a substitute for my abandoned application Serial No. 415,157 filed October 16, 1941.

Although I have described my invention in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A molding machine comprising, a base, upright supporting means fastened to the base, a horizontally disposed table mounted on the upper end of said upright supporting means and on which a pattern and a flask around the pattern may be supported, first and second brackets rigidly connected to said upright supporting means, said brackets each having attachment means provided thereon at a fixed lateral distance from said supporting means, said attachment means on said first and second brackets constituting a first pair and being mounted at a fixed elevated position above the base and being laterally spaced from each other and defining a line extending in a first direction, third and fourth brackets rigidly connected to said upright supporting means, said brackets each having attachment means provided thereon at a fixed lateral distance from said supporting means, said attachment means on said third and fourth brackets constituting a second pair and being mounted at a fixed elevated position above the base and being laterally spaced from each other and defining a line extending in the same general direction as said first direction, said attachment means on said first bracket and said attachment means on said third bracket being laterally spaced from each other and defining a line extending in a direction generally transverse to said first direction and said attachment means on said second bracket and said attachment means on said fourth bracket being laterally spaced from each other and defining a line also extending in a direction generally transverse to said first direction, first and second perpendicularly extending and laterally spaced guide bars having their lower ends secured to said base and having their upper ends steadily fastened respectively to the attachment means on said first and second brackets, third and fourth perpendicularly extending and laterally spaced guide bars having their lower ends secured to said base and having their upper ends steadily secured respectively to the attachment means on said third and fourth brackets, a first stripping pin supporting unit solely guided by the first and second guide bars and comprising an intermediately disposed first elevating means supported by the base and having first and second laterally extending bearing support arms connected to opposite sides of said elevating means, said first bearing support arm having vertically spaced bearings and slidably surrounding said first guide bar and said second bearing support arm having vertically spaced bearings and slidably surrounding said second guide bar, a second stripping pin supporting unit solely guided by the third and fourth guide bars and comprising an intermediately disposed second elevating means supported by the base and having third and fourth laterally extending bearing support arms connected to opposite sides of said second elevating means, said third bearing support arm having vertically spaced bearings and slidably surrounding said third guide bar and said fourth bearing support arm having vertically spaced bearings and slidably surrounding said fourth guide bar, an equalizing means having portions operatively interconnected between said base and both of said stripping pin supporting units for effecting a substantially simultaneous unitary movement of said stripping pin supporting units, and a plurality of stripping pins mounted on each stripping pin supporting unit and projecting upwardly in vertical disposition for engagement with the flask.

2. A molding machine comprising, a base, upright supporting means fastened to the base, a horizontally disposed table mounted on the upper end of said upright supporting means and on which a pattern and a flask around the pattern may be supported, first and second brackets rigidly connected to said upright supporting means, said brackets each having attachment means provided thereon at a fixed lateral distance from said supporting means, said attachment means on said first and second brackets constituting a first pair and being mounted at a fixed elevated position above the base and being laterally spaced from each other and defining a line extending in a first direction, third and fourth brackets rigidly connected to said upright supporting means, said brackets each having attachment means provided thereon at a fixed lateral distance from said supporting means, said attachment means on said third and fourth brackets constituting a second pair and being mounted at a fixed elevated position above the base and being laterally spaced from each other and defining a line extending in the same general direction as said first direction, said attachment means on said first bracket and said attachment means on said third bracket being laterally spaced from each other and defining a line extending in a direction generally transverse to said first direction and said attachment means on said second bracket and said attachment means on said fourth bracket being laterally spaced from each other and defining a line also extending in a direction generally transverse to said first direction, first and second perpendicularly extending and laterally spaced guide bars having their lower ends secured to said base and having their upper ends steadily fastened respectively to the attachment means on said first and second brackets, third and fourth perpendicularly extending and laterally spaced guide bars having their lower ends secured to said base and having their upper ends steadily secured respectively to the attachment means on said third and fourth brackets, a first stripping pin supporting unit solely guided by the first and second guide bars and comprising an intermediately disposed first elevating means supported by the base and having first and second laterally extending bearing support arms connected to opposite sides of said elevating means, said first bearing support arm having vertically spaced bearings and slidably surrounding said first guide bar and said second bearing support arm having vertically spaced bearings and slidably surrounding said second guide bar, a second stripping pin supporting unit solely guided by the third and fourth guide bars and comprising an intermediately disposed second elevating means supported by the base and having third and fourth laterally extending bearing support arms connected to opposite sides of said second elevating means, said third bearing support arm having vertically spaced bearings and slidably surrounding said third guide bar and said fourth bearing support arm having vertically spaced bearings and slidably surrounding said fourth guide bar, an equalizing means having two spaced side arms extending in the same general direction as said first direction and interconnected by a torsion bar extending in a direction generally transverse to said first direction, means for connecting the two side arms respectively to said stripping pin supporting units, and support means carried by the base and having spaced bearing means for rotatably supporting the torsion bar, and a plurality of stripping pins mounted on each stripping pin supporting unit and projecting upwardly in vertical disposition for engagement with the flask.

3. A molding machine comprising, a base, upright supporting means fastened to the base, a horizontally disposed table mounted on the upper end of said upright supporting means and on which a pattern and a flask around the pattern may be supported, first and second perpendicularly extending and laterally spaced guide bars having their lower ends rigidly secured to said base and having their upper ends steadily positioned at a fixed distance from said supporting means, said guide bars constituting a first pair and being laterally spaced from each other and defining a line extending in a first direction, third and fourth perpendicularly extending and laterally spaced guide bars having their lower ends rigidly secured to said base and having their upper ends steadily positioned at a fixed distance from said supporting means, said guide bars constituting a second pair and being laterally spaced from each other and defining a line extending in the same general direction as said first direction, said first guide bar and said third guide bar being laterally spaced from each other and defining a line extending in a direction generally transverse to said first direction and said second guide bar and said fourth guide bar being laterally spaced from each other and defining a line also extending in a direction generally transverse to said first direction, a first stripping pin supporting unit solely guided by the first and second guide bars and comprising an intermediately disposed first elevating means supported by the base and having first and second laterally extending bearing support arms connected to opposite sides of said elevating means, said first bearing support arm having vertically spaced bearings and slidably surrounding said first guide bar and said second bearing support arm having vertically spaced bearings and slidably surrounding said second guide bar, a second stripping pin supporting unit solely guided by the third and fourth guide bars and comprising an intermediately disposed second elevating means supported by the base and having third and fourth laterally extending bearing support arms connected to opposite sides of said second elevating means, said third bearing support arm having vertically spaced bearings and slidably surrounding said third guide bar and said fourth bearing support arm having vertically spaced bearings and slidably surrounding said fourth guide bar, an equalizing means having portions operatively interconnected between said base and both of said stripping pin supporting units for effecting a substantially simultaneous unitary movement of said stripping pin supporting units, and a plurality of stripping pins mounted on each stripping pin supporting unit and projecting upwardly in vertical disposition for engagement with the flask.

LESTER C. YOUNG.

REFERENCES CITED

The following references are of record in the file of this patent:

UNITED STATES PATENTS

| Number | Name | Date |
| --- | --- | --- |
| 851,166 | Herman | Apr. 23, 1907 |
| 1,524,117 | Tscherning | Jan. 27, 1925 |
| 1,626,225 | Campbell | Apr. 26, 1927 |
| 1,656,951 | Nicholls | Jan. 24, 1928 |
| 1,695,921 | Harmes | Dec. 18, 1928 |
| 1,851,321 | Oyster | Mar. 29, 1932 |
| 2,142,491 | Byerlin et al. | Jan. 3, 1939 |

FOREIGN PATENTS

| Number | Country | Date |
| --- | --- | --- |
| 328,012 | Great Britain | Apr. 16, 1930 |
| 241,066 | Germany | Nov. 24, 1911 |
| 540,972 | Germany | Jan. 4, 1932 |